United States Patent [19]

Porzel et al.

[11] 4,202,804

[45] May 13, 1980

[54] VISCOSITY STABLE, STAINABLE WOOD TEXTURED CAULKING COMPOSITION CONTAINING WATER IMMISCIBLE ORGANIC SOLVENT

[75] Inventors: Rita E. Porzel, Lisle; Cathryn D. Bator, Hoffman Estates, both of Ill.

[73] Assignee: DeSoto, Inc., Des Plaines, Ill.

[21] Appl. No.: 941,184

[22] Filed: Sep. 11, 1978

[51] Int. Cl.[2] .......... C08L 1/02

[52] U.S. Cl. .......... 260/17.4 R; 260/42.46

[58] Field of Search .......... 260/17.4 R, 42.46

[56] References Cited

U.S. PATENT DOCUMENTS 3,749,692 7/1973 Scoscos .......... 260/42.46

*Primary Examiner*—Edward M. Woodberry

*Attorney, Agent, or Firm*—Dressler, Goldsmith, Clement, Gordon & Shore, Ltd.

[57] ABSTRACT

A viscosity stable, stainable, wood textured aqueous latex caulking composition is disclosed in which wood particles have sorbed therein, water immiscible organic solvent providing a free-flowing, solvent-wet powder. An aqueous emulsion of film-forming resin particles is mixed in and an oily plasticizer for the resin particles is added to provide a $T_g$ below about $-40°$ C. unless the resin particles are internally plasticized. The proportion of wood particles, the solids content of the aqueous emulsion and the proportion of oily plasticizer or other thickener provides a viscous mass of gunable viscosity.

13 Claims, No Drawings

VISCOSITY STABLE, STAINABLE WOOD TEXTURED CAULKING COMPOSITION CONTAINING WATER IMMISCIBLE ORGANIC SOLVENT

DESCRIPTION

Technical Field

This invention relates to a viscosity stable, stainable, aqueous latex wood texture caulking composition and to the preparation thereof.

Background Art

The incorporation of wood particles into aqueous caulking compositions to provide a stainable material possessing a wood texture has been attempted, but the final caulking compositions were not viscosity stable which is of great importance when the product will be stored for unpredictable periods of time before sale or use.

Disclosure of Invention

We have found that when wood particles are treated with water immiscible organic solvents prior to being formulated into an aqueous latex caulking compound, that the resulting caulk composition will not change its viscosity appreciably on storage as was the case prior to our invention. Thus, our caulk compositions may be used immediately or after prolonged storage.

In accordance with this invention, the caulk is comprised of wood particles which contain sorbed, water immiscible organic solvent providing a free-flowing, but solvent-wet powder, and an aqueous emulsion of coalescable film-forming plasticized resin particles. The plasticizer is normally an external plasticizer for the resin particles. The proportion of wood particles, the solids content of the aqueous emulsion and the plasticization of the resin particles provide a viscous mass of gunable viscosity. The caulk of this invention may be prepared by combining the free-flowing powder and aqueous emulsion prior to finally thickening the composition with the oily plasticzer.

The wood particles used in this invention are commercially available and may be made from mixed woods. We have found wood flours made from hardwoods with a particle size in the range of 149–590 microns to be particularly preferred, however wood flours whose particle size is about 120 microns to about 600 microns are also quite effective. Sawdust from both hard and soft woods, such as hickory and pine, are also effective, as are mixtures of sawdusts from several varieties of woods. Sawdust particle sizes are typically about 250 microns to about 2000 microns. Sawdusts and wood flours may be mixed and used effectively with the particle size of the wood particles determining the coarseness of the final caulk's texture. Thus, if a fine textured wood is to be caulked, small particle sizes such as the preferred about 180 micron particles are desirable, while if a rough texture is desired, sawdust having larger particle sizes up to about 2000 microns may be used.

Several water immiscible organic solvents may be used in this invention, but aliphatic hydrocarbon solvents are preferred. Boiling point ranges from about 130° C. to about 200° C. Preferred solvents of this description are mineral spirits, turpentine and turpentine substitutes, with mineral spirits being most preferred.

To prepare the wood particles for incorporation into the caulk composition, the wood particles and organic solvent are simply mixed together with sufficient agitation to insure an even distribution of the solvent on the wood particles. It is convenient to pour the solvent into a container containing the wood particles.

The organic solvent is mixed into wood particles in an amount of at least about 60% by weight, based on the weight of the wood, in order to provide an improvement in viscosity stability. More solvent improves the desired stability, but it is not desired to use so much solvent that the wood cannot sorb it, since then the wood particles would stick together or solvent would separate. In preferred practice, the solvent-wetted wood particles will look dry, but they will be wet to the touch. About 60%–100% of solvent is used, based on the weight of the wood, most preferably about 70%–80%.

The mechanism by which our invention works is not now fully understood. We have found, however, that when wood particles are incorporated into water-based, emulsion caulking systems without a pretreatment as disclosed herein, that large viscosity changes occur on storage. Thus, those compositions which are formulated to what is thought to be a proper viscosity for use in a caulking gun, i.e., a gunable viscosity, after standing or storage prior to consumer use the resultant caulk is too viscous to be used with a caulking gun or to be tooled as with a trowel like a putty. Conversely, if this increase in viscosity is taken into account, and the viscosity of the formulated composition is made thinner than would normally be used by a consumer, then products of these compositions must be aged and cannot be sold or used before it thickens. It is thought that the thickening which occurs on aging without prior pretreatment of the wood particles with an organic solvent occurs, as a result of the delayed sorption of water from the aqueous latex component of the composition. The pretreatment of our invention appears to prevent such delayed sorption of water, but the precise mechanism is not clear. The result, however, is that the caulk viscosity remains approximately constant from the time of initial formulation.

We have found that when untreated samples of wood particles are treated with a few drops of water, that the water forms droplets upon the surface of the wood particles and required 3 to 4 hours for soprtion to take place. When wood flour was treated with 71% by weight of mineral spirits, the water drop test showed water to be sorbed in about 5 to about 10 minutes. Similar tests using the aqueous emulsion of coalescable film-forming resin particles again showed that, with untreated wood particles, sorption of aqueous droplets required 3 to 4 hours, while with wood particles treated as has just been described, sorption occurred almost immediately. Similar tests were run using solvents such as 2-methoxyethanol, 2-butoxyethanol and 2-ethoxyethanol acetate. All of these solvents were sorbed into the wood particles in the proportion just described. Sorption of both water and the just described emulsion occurred almost immediately. Nonetheless, caulk compositions formulated using these three solvents did not exhibit stable viscosities, showing the significance of solvent selection.

The caulk compositions of this invention are aqueous latices in which the latex particles are plasticized to be coalescable at −40° C. which provides an effective flexible binder. The plasticizer may be external or internal. Using an external plasticizer, the resin particles swell to increase viscosity by the sorbtion of the plasticizer. These latices are formed from an aqueous emulsion of coalescable film-forming resin particles which are combined with the above pretreated wood particles, and a plasticizing agent is added to decrease the $T_g$ wherever it is too high. The coalescable film-forming resin particles of these aqueous emulsions are typically acrylic polymers which have glass transition temperature ($T_g$) low enough to permit coalescence at about 0° C. A $T_g$ of about −5° C. to about −60° C. is preferred. When the $T_g$ is above about −40° C., the external plasticizer is added to enhance the binding capacity and the flexibility of the final caulk. External plasticizer serves to increase viscosity so if it is not needed, then some other thickener must be used, such as hydroxy ethyl cellulose. Resin particles having $T_g$ values below −40° C. provide caulks which remain rubbery at the low temperatures commonly found during the winter time in the United States. These aqueous emulsions are well known in the art and will not be described at length. They can be provided by copolymers of ethyl acrylate and methyl methacrylate, or by copolymers of vinyl acetate and butyl methacrylate, or by copolymers of vinyl acetate and ethylene. Ethyl hexyl acrylate and ethylene are particularly desirable to provide internal plasticization. A preferred aqueous emulsion for the preparation of caulks in this invention is produced by Rohm and Haas Company under the trademark RHOPLEX LC-40. This emulsion contains about 55% solids of a thermoplastic acrylic polymer having a $T_g$ of about −9° C.

As used in our invention, the aqueous emulsions of coalescable film-forming particles comprise about 35% to about 70% by weight of the total mass of the composition. Preferably, they are used at about 45% to about 60% of the total composition. These emulsions generally contain about 45% to about 65% by weight of resin solids, and preferably contain about 50% to about 60% solids.

The wood particles may constitute from 5% to 30% of the weight of the composition, preferably from 10% to 25%.

In compounding the compositions of this invention the pretreated wood particles and aqueous emulsion are mixed prior to the addition of an oily plasticizer which may be needed, or prior to the addition of thickener. In this way intimate mixing is achieved before the composition has the high viscosity needed in the final product. Although we have found it preferable to add the aqueous emulsion of resin particles to the wood particles, the wood particles may be added to the emulsion. In either event, the wood particle-emulsion system is agitated to assure a uniform distribution of wood particles in the emulsion before agents causing thickening are added.

The compositions of this invention frequently contain an oily plasticizer of low volatility. The function of this plasticizer, along with the solids contributed by the wood particles and the emulsion polymer, is to provide flexibility and integrity to the final product and to build the viscosity of the caulk. These plasticizers do not volatilize to any significant extent over the like of the compositions and are therefore regarded as permanent plasticizers. The plasticizers also may have tackifying properties which add to the rubbery, sticky nature of the resin particles. These plasticizers are selected to be compatible with the resin in the emulsion, and they may be selected from a relatively large group of commercially available materials. Such materials include, but are not limited to, processing oils, liquid polyolefins, ester plasticizers, chlorinated polyhydrocarbons, and low melting resins. The amount of plasticizer required to produce the desired viscosity varies with the particular oily plasticizer chosen, the aqueous emulsion used, and the amount of wood particles in the composition. Typically the amount can range from about 0.10 to about 1.0 times the weight of the emulsion used in the formation, the preferred range is about 0.2 to about 0.4 times the weight of the aqueous emulsion. Examples of suitable naphthalenic, paraffenic and aromatic processing oils by trademark names are NECTON 60, FAMAX 58, CORAY 80, SUNOIL 2280 and SUNDEX 53. Also suitable are viscous liquids generally regarded as plasticizers in the elastomer art, such as polychlorinated polyphenols known under the trademark names AROCHLOR 1254 and AROCHLOR 1263 and the ester plasticizers for example, dioctylphthalate, butyl oleate and liquid wood rosins. The liquid grades of polyolefins, especially polymers of the $C_3$ and $C_4$ olefins, such as for example, polybutenes, polyisobutylenes, and polypropylenes are suitable as low volatile-plasticizers. Particularly preferred is a medium molecular weight, low viscosity, non-volatile polymeric plasticizer designed for plasticizing acrylic resins, known by the trademark name PARAPLEX WP-1. This material boils at a temperature above about 300° C. at atmospheric pressure and is used in the preferred weight ratio range disclosed hereinabove, more preferably at a weight of about one-fourth that of the weight of the aqueous emulsion which is used.

The oily plasticizers used in this invention are preferably added after the wood particles and aqueous emulsion are combined. This order of addition is not essential, but it improves production as described previously. Prior to addition of the oily plasticizer, the viscosity of the composition is relatively thin and it can be easily poured. Upon addition of the oily plasticizer, and after appropriate mixing, viscosity increases to the point where the mixture is no longer pourable at room temperature and has a viscosity of about 5000 poise. At this viscosity the caulk composition becomes gunable, i.e., capable of extrusion using a caulking gun, and it may also be worked with tools such as a trowel or putty knife as is often necessitated when caulking is performed.

When an internally plasticized latex is used, as can be obtained from Rohm & Haas Company under the trade designation RHOPLEX LC-67, then the caulk viscosity is obtained by the addition of a thickener, typically hydroxy ethyl cellulose.

In addition to the three components (pretreated wood particles, aqueous emulsion of film-forming coalescable resin particles and oil plasticizer) several other ingredients may be added to the caulk compositions for known purposes, e.g., to assist in dispersing the wood particles therein, to provide added tack or lubricity, or for biocidal or fungicidal purpose. These added ingredients are not essential for forming the caulk compositions of this invention.

Best Mode for Carrying Out the Invention

The invention is illustrated by, but not limited to the following example:

EXAMPLE

Viscosity Stable, Stainable, Latex Caulk Composition

FORMULA

| | Components | Percent by Weight |
|---|---|---|
| 1) | Wood flour (about 140-600 micron particles | 17.3 |
| 2) | Mineral spirits (boiling range about 130° C. to about 200° C.) | 12.1 |
| 3) | Aqueous emulsion (RHOPLEX LC-40) | 52.1 |
| 4) | TRITON X-405[1] | 1.4 |
| 5) | CALGON T[2] | 1.5 |
| 6) | PARAPLEX WP-1[3] | 14.5 |
| 7) | TAMOL 850 (30%)[4] | 0.1 |
| 8) | DOWICIL 75[5] | 0.1 |
| | | 100.1 |

Note [1]Nonylphenol condensed with about 40 moles of ethylene oxide, available from Rohm & Haas Co.
Note [2]Sodium-zinc phosphate glass composition in powdered form used as a dispersant, available from Merck & Co.
Note [3]Medium molecular weight, low viscosity, non-volatile, polymeric plasticizer for acrylic polymers, available from Rohm & Haas Co.
Note [4]A low-foaming dispersant for solid materials in acrylic emulsion systems and is available from Rohm & Haas Co.
Note [5]A biocidal preservative used for retarding the growth of mold and bacteria, available from Dow Chemical Co.

Component 1 is added to an appropriately sized vessel equipped with a mechanical stirring apparatus, and component 2 is added thereto and mixed therewith until all of component 2 is added and a dry appearing, free-flowing powder results. Component 3 is then added with stirring to the above mixture and once all is added the resultant admixture which is a latex filled with pretreated wood flour is mixed further for about 10 minutes or until a uniform dispersion is created. Component 4 is then added and the resultant admixture mixed for about another 10 minutes. Component 5 is added and mixed similarly. Component 6 is added and as it becomes mixed into the admixture, the viscosity increases and mixing is continued until a high viscosity, non-pourable mass of about 5000 poise viscosity is produced. Component 7 is then added and the resulting mass mixed again for 10 minutes. Component 8 is added last and the whole mixture is then mixed for 30 minutes at which time it is placed into tubes for use with caulking guns.

Industrial Applicability

Caulk compositions made by the above procedure did not change viscosity appreciably from the time they were made. When gunned between two wooden siding boards, the caulk made by the above method exhibited a wood-like texture, and when stained gave a uniform appearance and color to match that of the adjacent boards.

What is claimed is:

1. A viscosity stable, stainable, wood textured, aqueous latex caulking composition comprising from 5% to 30% of the weight of the composition of wood particles having sorbed therein a water immiscible organic solvent in an amount of at least about 60% of the weight of the wood to provide a free-flowing, solvent-wet powder; from about 35% to about 70% by weight of the composition of an aqueous emulsion of film-forming plasticized resin particles coalescable at about −40° C.; the proportion of wood particles, the resin solids content of said aqueous emulsion and the plasticization of the resin particles providing a viscous mass of gunable viscosity, and said organic solvent providing viscosity stability.

2. A caulking composition as recited in claim 1 wherein said wood particles are present in an amount of about 10% to about 25% by weight of the composition.

3. A caulking composition as recited in claim 1 wherein said organic solvent is an aliphatic hydrocarbon solvent.

4. A caulking composition as recited in claim 3 wherein said solvent is selected from the group consisting of mineral spirits, turpentine and turpentine substitutes.

5. A caulking composition as recited in claim 3 wherein said organic solvent has a boiling range of about 130° C. to about 200° C.

6. A caulking composition as recited in any of claims 1–5 wherein said wood particles comprise wood flour.

7. A caulking composition as recited in claim 1 wherein said wood particles are selected from the group consisting of wood flour, sawdust and mixtures thereof, said sawdust having particle sizes of about 250 to about 2000 microns.

8. A caulking composition as recited in any of claims 1–5 and 7 wherein said aqueous emulsion contains about 45% to about 65 % by weight of resin solids.

9. A caulking composition as recited in any of claims 1–5 and 7 wherein said emulsion has a resin solids content of about 50% to about 60%.

10. A caulking composition as recited in claim 9 wherein said wood particles have sorbed therein about 70%–80% by weight of said solvent, based on the weight of the wood, and an oily plasticizer is relied upon to provide the desired low coalescing temperature and increased viscosity.

11. A method of preparing a viscosity stable, stainable, wood textured, aqueous latex caulking composition which comprises, providing a free-flowing, solvent-wet mixture of water immiscible organic solvent and wood particles of solvent-wet, powder, mixing said free-flowing, solvent-wet powder with an aqueous emulsion of film-forming, thermoplastic acrylic resin particles coalescable at 0° C., and then mixing in an oily plasticizer for said resin particles to increase the viscosity of the mixture, the proportion of said free-flowing powder, the solids content of said aqueous emulsion and the proportion of said oily plasticizer providing a viscous mass of gunable viscosity.

12. A caulking composition as recited in claim 9 wherein said wood particles have sorbed therein at least about 60% by weight of said solvent, based on the weight of the wood, and said resin particles are internally plasticized to possess the desired low coalescing temperature.

13. A viscosity stable, stainable, wood textured aqueous latex composition comprising from 5% to 30% of the weight of the composition of wood particles having sorbed therein a water immiscible organic solvent in an amount of at least about 60% of the weight of the wood to provide a free-flowing, solvent-wet powder; from about 35% to about 70% by weight of the composition of an aqueous emulsion containing about 45% to about 65% by weight of coalescable film-forming plasticized resin particles; the proportion of wood particles, the resin solids content of said aqueous emulsion, and the plasticization of the resin particles providing a viscous mass, and said organic solvent providing viscosity stability.

* * * * *